US011409742B2

(12) United States Patent
Mathur

(10) Patent No.: US 11,409,742 B2
(45) Date of Patent: Aug. 9, 2022

(54) EFFICIENT DATABASE SEARCHING FOR QUERIES USING WILDCARDS

(71) Applicant: salesforce.com, inc., San Francisco, CA (US)

(72) Inventor: Rohitashva Mathur, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 418 days.

(21) Appl. No.: 16/211,633

(22) Filed: Dec. 6, 2018

(65) Prior Publication Data

US 2020/0183934 A1 Jun. 11, 2020

(51) Int. Cl.
*G06F 16/2453* (2019.01)
*G06F 16/22* (2019.01)

(52) U.S. Cl.
CPC .... *G06F 16/24542* (2019.01); *G06F 16/2272* (2019.01)

(58) Field of Classification Search
CPC .................................................. G06F 16/24542
See application file for complete search history.

(56) References Cited

U.S. PATENT DOCUMENTS 5,577,188 A 11/1996 Zhu
5,608,872 A 3/1997 Schwartz
5,649,104 A 7/1997 Carleton
5,715,450 A 2/1998 Ambrose et al.
5,761,419 A 6/1998 Schwartz
5,819,038 A 10/1998 Carleton
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
(Continued)

OTHER PUBLICATIONS

U.S. Appl. No. 13/986,251, dated Apr. 16, 2013.

*Primary Examiner* — Van H Oberly
(74) *Attorney, Agent, or Firm* — Dergosits & Noah LLP; Todd A. Noah

(57) ABSTRACT

Described are mechanisms for creating and utilizing a specialized index to improve the efficiency of various types of leading wildcard searches without having to unduly burden the system with write requests. The mechanisms may identify particular fields to be included in one or more types of specialized indexes that are accessed in response to particular types of wildcard queries including various combinations of leading, trailing, and intermediate wildcard operators. In addition, the mechanism may perform various pre-processing by an application when creating such indexes to conserve resources of an underlying database system. The mechanisms may also execute such wildcard queries in a manner that appears to be synchronous to a user while maintaining such indexes asynchronously for efficiency purposes.

23 Claims, 12 Drawing Sheets

(56) References Cited

U.S. PATENT DOCUMENTS

| | | | |
|---|---|---|---|
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2007/0078887 | A1* | 4/2007 | Harvey ............... G06F 16/2246 707/999.102 |
| 2008/0072209 | A1* | 3/2008 | Farrah ....................... G06F 8/73 717/113 |
| 2009/0063415 | A1 | 3/2009 | Chatfield et al. |
| 2009/0063465 | A1* | 3/2009 | Ferragina .............. G06F 16/316 707/999.005 |
| 2009/0100342 | A1 | 4/2009 | Jakobson |
| 2009/0177744 | A1 | 7/2009 | Marlow et al. |
| 2010/0094854 | A1* | 4/2010 | Rouhani-Kalleh .......................... G06F 16/3325 707/706 |
| 2010/0262608 | A1* | 10/2010 | Hornkvist ........... G06F 16/2228 707/742 |
| 2012/0233137 | A1 | 9/2012 | Jakobson et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0359537 | A1 | 12/2014 | Jakobson et al. |
| 2015/0007050 | A1 | 1/2015 | Jakobson et al. |
| 2015/0095162 | A1 | 4/2015 | Jakobson et al. |
| 2015/0172563 | A1 | 6/2015 | Jakobson et al. |
| 2016/0366113 | A1* | 12/2016 | Dawoud ................. G06F 16/14 |
| 2018/0052929 | A1* | 2/2018 | Liu ..................... G06F 16/3347 |

* cited by examiner

100 – Base Table 105 110 115

| Entity ID | Name | ... | ... | ... | Class Size |
|---|---|---|---|---|---|
| 996 | Stanford Law School | ... | ... | ... | Small |
| 994 | Berkeley School of Law | ... | ... | ... | Medium |
| 995 | Hastings College of the Law | ... | ... | ... | Large |

FIG. 1

100 – Base Table

| Entity ID | Name | ... | ... | ... | ... | Class Size |
|---|---|---|---|---|---|---|
| 996 | Stanford Law School | ... | ... | ... | ... | Small |
| ... | ... | ... | ... | ... | ... | ... |
| ... | ... | ... | ... | ... | ... | ... |

300 – Tri-gram Index

320

| Entity ID | Name | Variant |
|---|---|---|
| 996 | Stanford Law School | sta |
| 996 | Stanford Law School | tan |
| . . . | . . . | . . . |
| 996 | Stanford Law School | hoo |
| 996 | Stanford Law School | ool |

FIG. 3

EFFICIENT DATABASE SEARCHING FOR QUERIES USING WILDCARDS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to performing a search within a database system, and more specifically, executing queries that include a wildcard.

BACKGROUND

"Cloud computing" services provide shared resources, applications, and information to computers and other devices upon request. In cloud computing environments, services can be provided by one or more servers accessible over the Internet rather than installing software locally on in-house computer systems. Due to the scalable nature of such environments, customers of such services may store vast amounts of data which require efficient searching techniques. These search techniques often include the ability to search data based on wildcard operations. Some search data structures, however, perform differently based on the positioning of the wildcard operators relative to a search term. Accordingly, there is a need to perform efficient searches irrespective of the positioning of wildcard operators in a search query.

BRIEF DESCRIPTION OF THE DRAWINGS

The included drawings are for illustrative purposes and serve only to provide examples of possible structures and operations for the disclosed inventive systems, apparatus, methods and computer program products for providing run-time querying of multi-tenant non-relational database objects. These drawings in no way limit any changes in form and detail that may be made by one skilled in the art without departing from the spirit and scope of the disclosed embodiments.

FIG. 1 shows an example base table that includes data to be searchable using a leading wildcard query according to one or more embodiments of the disclosure.

FIG. 3 shows an example of an n-gram index used in conjunction with one or more types of leading wildcard searches according to one or more embodiments of the disclosure.

DETAILED DESCRIPTION

Figure 2:
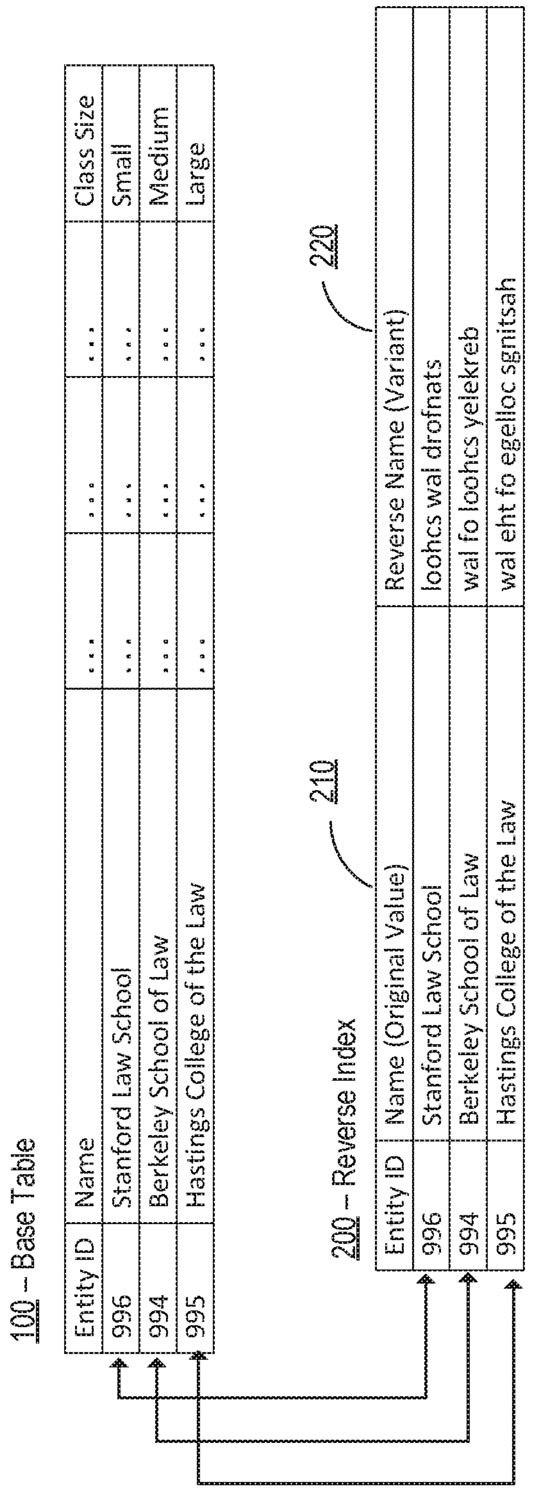
FIG. 2 shows an example of a reverse index used in conjunction with one or more types of leading wildcard searches according to one or more embodiments of the disclosure.

Examples of systems, apparatus, methods and computer program products according to the disclosed embodiments are described in this section. These examples are being provided solely to add context and aid in the understanding of the disclosed embodiments. It will thus be apparent to one skilled in the art that embodiments may be practiced without some or all of these specific details. In other instances, certain operations have not been described in detail to avoid unnecessarily obscuring embodiments. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference to "one embodiment" or "an embodiment" or "some embodiments" means that a particular operation, feature, structure, or characteristic described in conjunction with the embodiment can be included in at least one embodiment. The appearances of the phrase "embodiment" in various places in the specification do not necessarily all refer to the same embodiment.

Some embodiments of the disclosed systems, apparatus, methods and computer program products are configured to provide the ability to efficiently perform a search query that includes leading wildcards.

A database system may store information as objects and a database table may store information of various objects. When searching such tables, systems often employ various data structures to facilitate searching. For example, such data structures may include a B-tree data structure that is used for searching. These data structures, however, may not be optimized for performing searches that include a leading wildcard identifier (or operator). Accordingly, in some embodiments of a first aspect of the disclosure, described is a mechanism for creating (or updating) one or more specialized indexes to improve the efficiency of a various queries that include a leading wildcard without unduly burdening the resource requirements of the database system. For example, the mechanism may maintain such specialized indexes without requiring synchronous write requests. Accordingly, the mechanism may maintain such indexes asynchronously while still providing functionality that is perceived as being synchronous by a user.

In some embodiments, the mechanism may maintain a particular type of index for various types of wild card queries. For example, the mechanism may maintain a reverse index to improve the performance of queries that include only a leading wildcard operator (e.g. no trailing wildcard operators). In addition, the mechanism may maintain n-gram indexes or permutation indexes (including various variants of a permutation index) for queries that include at least a leading wildcard operator along with one or more trailing or intermediate wildcard operators. In some instances, however, maintaining such indexes may be resource intensive (e.g. susceptible to data explosion). Accordingly, the mechanism may also employ features that minimize the resource demands of a database that maintains such indexes. For example, in some embodiments, the mechanism may create such specialized indexes or portions thereof by performing various pre-processing operations from an application (e.g. application server that communicates with the underlying database). For instance, the application may execute or provide instructions or metadata for creating the values to be included within a specialized index. In one embodiment, the pre-processing may include instructions and/or metadata for parsing values (e.g. values to be searched) and variants of the values to be stored by a specialized index. For example, the pre-processing may determine how to divide and/or permute original values to create the variant values to be stored in a specialized index. In one embodiment, the application itself may perform processing to determine such variants, which are then merely stored by the database. Accordingly, in some embodiments, resource intensive processing may at least be partially offloaded from a database system to an application (e.g. client or server application).

In some embodiments, the specialized indexes may be created dynamically based on various workloads of a customer. For example, it may be determined that particular customers include workloads with specific types of leading wildcard queries, and accordingly, the mechanism may generate particular specialized indexes to decrease such workloads and improve the performance of such queries.

When creating specialized indexes, the mechanism may perform various operations to identify and process particular data of a database. These operations may include identifying particular data of a table to be included in a specialized index. For example, the particular data may include data that are likely to be included as part of a leading wildcard query. After identifying the particular type of data, the mechanism may perform one or more of a normalization, a reversal, and a decomposition of values of the data such that a variant of the value may be stored as actual values in one or more tables from which specialized indexes are created. For example, a variant may include a reverse of a value (e.g. in the case of a reverse index), or various portions or permutations of the value (e.g. in the case of an n-gram index or permutation index). Accordingly, these specialized indexes may then be used to identify appropriate records (e.g. by filtering a base table using the original value) when providing results for various types of leading wildcard queries.

In some embodiments of a second aspect of the disclosure, described is a mechanism for executing a leading wildcard query by utilizing one or more of the specialized indexes.

The mechanism may determine whether a particular query includes a leading wildcard, and if so, may further determine whether a specialized index associated with such a query exists. If such a specialized index exists, the mechanism may modify the leading wildcard query or generate a new query (e.g. via a query builder) such as by reversing the search term, which is provided as a prefix to the wildcard identifier (or operator) after correctly normalizing and decomposing the search term. In addition, the specialized indexes may allow the system to utilize search data structures such as a B-tree to perform an efficient search in response to a leading wildcard query.

In addition, the mechanism may execute queries that are perceived by a user as being synchronous despite certain data being maintained in an asynchronous manner. For example, in response to receiving a leading wildcard query, the system may search the specialized index along with a change set table that maintains values that have changed since the last asynchronous maintenance of the specialized index. For instance, in response to obtaining data using the specialized index, the mechanism may obtain recently updated data from the change set and combine the data to provide a result to the query. Accordingly, the system may provide synchronous functionality while at the same time minimizing resources by maintaining values within the specialized index asynchronously. In order to provide such functionality, the mechanism may include accessing various data structures such as database tables as further described herein.

FIG. 1 shows an example base table 100 that includes data to be searchable using a leading wildcard query according to one or more embodiments of the disclosure. As shown in this simplified example, the base table 100 may be associated with a school (e.g. law school) object or entity. As shown, the base table 100 includes a name 110 column (or field) that corresponds to a school name, an Entity ID 105, and one or more other columns or fields such as a class size 115. In one embodiment, the Entity ID 105 (or other type of identifier) may act as a primary key. In addition, any other combination of columns may be used as a primary key. For example, a combination of an identifier and name (e.g. name 110) may be used as a primary key. When receiving queries related to such school entities or objects, it may be determined that school names are often searched using various wildcard queries. Accordingly, the system may identify the name 110 (and corresponding field values) to be efficiently searchable using a leading wildcard query. The system (e.g. database system) may collect, parse, and store data into one or more indexes to facilitate fast and accurate information retrieval. Accordingly, one or more of the values of this name 110 may be processed and included in a specialized index.

In some embodiments, the specialized index (or index table) may be maintained in an asynchronous manner. For example, as further described herein, when a query is received, the system may perform various operations (e.g. a combine, merge, join, etc.) to ensure accurate information (e.g. updated information) is provided to a user. Accordingly, the system may allocate resources in an efficient manner while still providing synchronous functionality to the user.

The one or more specialized indexes may provide for an efficient search in response to executing of various types of leading wildcard queries. Each specialized index may be one of several types of indexes such as a reverse index (e.g. an index including reverse values), an n-gram index (e.g. tri-gram index), permutation index, or other type of index structure. The specialized index may be stored in its own table (e.g. physically or logically). In one embodiment, these tables may include native indexes to efficiently look up various values and to obtain a primary key of the value in the base table (or some other form of pointer to a storage location of the data corresponding role in the base table). For example, the index may be based off each variant value and the primary key. As another example, the index may be based off each variant value, the primary key, and the original value. As further described herein, the original values may also then be used to filter values of a base table to provide relevant results for a query.

In some embodiments, a leading wildcard search may include only a leading wildcard (e.g. only a wildcard search identifier as a prefix to a search term). In response to such a query, in some embodiments, a reverse index as shown in FIG. 2 may be accessed.

FIG. 2 shows an example of a reverse index 200 used in conjunction with one or more types of leading wildcard searches according to one or more embodiments of the disclosure. In one embodiment, this reverse index 200 may be used as an index for performing searches when executing a query that includes only a leading wildcard (e.g. no trailing wildcard).

As shown in this example, the reverse index 200 may include a variant of a value after performing a processing. For example, the processing may include a normalization, a variant generation, and a decomposition of values. In this example of a reverse index 200, the variant includes a reverse name field 220 for a reverse of the name values. As shown, the reverse name field 220 is associated with the original name field 210. Accordingly, the system may perform an efficient search (e.g. using a B-tree data structure) by referencing the newly created (or updated) reverse school names for certain types of wildcards queries (e.g. queries including only a leading wildcard). As shown, the reverse index 200 may be linked with the base table 100 using a primary key (e.g. combination of entity ID and name). Accordingly, as further described herein, the base table 100 may be filtered using the results (e.g. relevant variants) from searching the specialized index.

In addition, in some embodiments, a leading wildcard query may also include a leading and a trailing and/or intermediate wildcard (e.g. wildcard search identifier as a prefix and postfix to one or more search terms). In response to such a query, in some embodiments, an n-gram index as shown in FIG. 3, or a permutation index as shown in FIG. 4, may be accessed.

FIG. 3 shows an example of an n-gram index used in conjunction with one or more types of leading wildcard searches according to one or more embodiments of the disclosure. As shown in this example, the n-gram index may be in the form of a tri-gram index 300. In one embodiment, this tri-gram index 300 may be used as an index for performing searches when executing a query that includes a leading wildcard as well as one or more intermediate or trailing wildcards. As shown, the tri-gram index 300 may include variant fields 320 to be used to improve searches in response to such queries. For instance, the tri-gram configuration may include portions of the name field as 3 character variants. As shown, each of these variants may be stored as its own row and associated with the original value and/or primary key. In some embodiments, generation of these variants may be performed by an application (e.g. application server) to preserve resources of an underlying database system. It should be noted that the n of the n-gram index may be customized based on various characteristics including resource costs to create such an index. As shown, the tri-gram index 300 may be linked with the base table 100 using a primary key (e.g. combination of entity ID and name). Accordingly, as further described herein, the base table 100 may be filtered using the results (e.g. relevant variants) from searching the specialized index.

Other types of specialized indexes may also be used when executing a query that includes a leading wildcard as well as one or more intermediate or trailing wildcards. For example, a permutation index may also be used as shown in FIG. 4.

Figure 4:
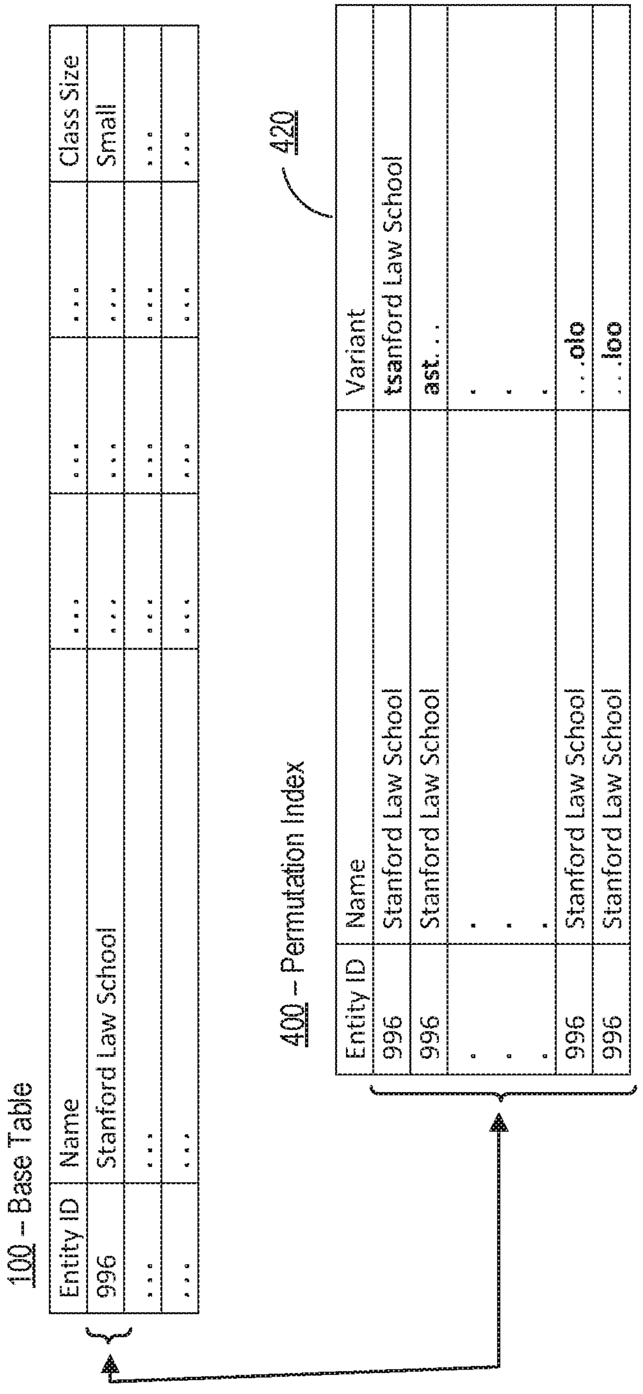
FIG. 4 shows an example of a permutation index used in conjunction with one or more types of leading wildcard searches according to one or more embodiments of the disclosure.

FIG. 4 shows an example of a permutation index used in conjunction with one or more types of leading wildcard searches according to one or more embodiments of the disclosure.

As shown in this simplified example, a permutation index 400 may include a permutation variant field 420 to further improve searches in response to such queries. For instance, the variants may include values that may include a portion or all of the original value such that a search data structure (e.g. B-Tree) may be used as part of a wildcard search. As shown, each of these variants may be stored as its own row and associated with the original value and/or primary key. As shown, the permutation index 400 may be linked with the base table 100 using a primary key (e.g. combination of entity ID and name). Accordingly, as further described herein, the base table 100 may be filtered using the results (e.g. relevant variants) from searching the specialized index. In some embodiments, generation of these variants may be performed by an application server to preserve resources of an underlying database system.

As described, the above specialized indexes may be used in response to specific types of wildcard queries. A leading wildcard query may include a query with a wildcard search identifier as a prefix to a search term. In addition, a leading wildcard query may also include a trailing wildcard. For example, a leading wildcard query that also includes a trailing wildcard would include a wildcard search identifier as a prefix and a postfix (or suffix). For example, a wildcard search identifier may include a percent sign character (e.g. "%") that represents zero, one, or multiple characters, or an underscore character (e.g. "_") that represents a single character, as well as any other characters or identifiers (e.g. "?") that would be known to a person of ordinary skill in the art.

For example, the following search query examples include one or more wildcard search identifiers used in conjunction with the search term ("law") within the name field of a stored object (e.g. customer object). For instance, as a first example, (WHERE Name LIKE '%law') is a leading wildcard query that searches for values that end with "law" within a name field of an object. Accordingly, as shown in this example, the system may search field 220 of reverse index to determine that "Berkeley School of Law" and "Hastings School of Law" include a name that ends in "law."

For example, the following search query examples include at least a leading and trailing wildcard search identifier used in conjunction with the search term ("law") within the name field of a stored object.

For instance, as a second example, (WHERE Name LIKE '%law%') is a leading and trailing wildcard query that searches for values that have "law" in any position within a school name field of an object. Accordingly, as shown in this example, the system may search index fields 320 to determine that "Stanford Law School," "Berkeley School of Law," and "Hastings School of Law" include a name that include the term "law."

For instance, as a third example, (WHERE Name LIKE 'law%') is a leading and trailing wildcard query that searches for values that have "law" starting in the second position within a customer name field of an object.

As a fourth example, (WHERE Name LIKE '%law%abc%') is a leading and trailing wildcard query that also includes an intermediate wildcard. Accordingly, such a query searches for values that have "law" followed by "abc" within a customer name field of an object.

In some embodiments, in order to process a query that includes a leading, intermediate, and trailing wildcard, the system may perform additional steps (e.g. one or more heuristics) to improve the efficiency of such a search. For example, the system may determine which search term "law" or "abc" should be searched first. In one embodiment, the system may determine the prevalence of a particular term. For example, if the term "law" is prevalent amongst a data set, the system may instead initiate a search starting with the "abc" term. In addition, in some embodiments, the system may perform a sampling of a data set to determine the prevalence of a particular search terms. For example, the system may sample x number of records from amongst the total of number of y records of a data set. Based on the prevalence of a particular search term within the sample, the system may extrapolate the prevalence of a term amongst the entire data set. Based on such an extrapolation, the system may then search the term that is likely to be less prevalent to improve the efficiency of the search.

It should also be noted that a leading wildcard search using various other search operations or functions that would be known to a person of ordinarily skill in the art are also contemplated in addition to the examples provided above. In addition, it should be noted that indexes 200, 300, and 400 although shown as separate database tables, may be combined into a single database table (or subsets thereof). Accordingly, such an index (or subsets thereof) may be used for a leading wildcard only query, as well as a leading and a trailing wildcard query.

Figure 5A:
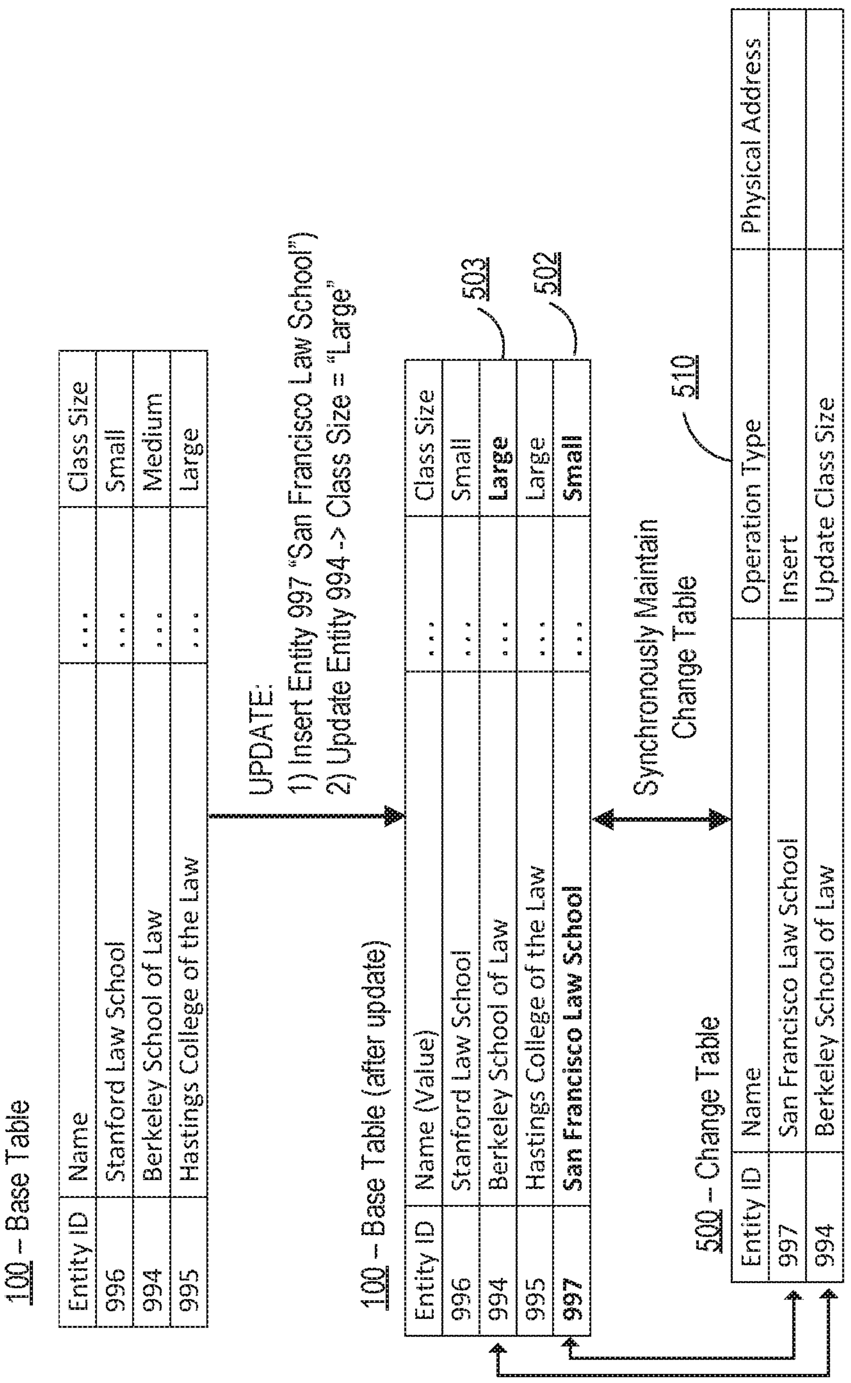
FIG. 5A shows an example of a base table and a change table after an update to data according to one or more embodiments of the disclosure.

FIG. 5A shows an example of a base table 100 and a change table 500 after an update according to one or more embodiments of the disclosure. As shown, the base table 100 may be updated with new data (e.g. new record 503) inserted as Entity 997. In additional, as shown, an existing record (e.g. record 502) may be updated (e.g. Class Size updated to "Large"). In some embodiments, the system may maintain a change table (or change set, change tracking data structure, or intermediate table) to store information reflecting updates to various type of data and/or objects. For example, the information stored in the change table 500 may include metadata 510 indicating the type of update performed and/or the actual values of the updates. As shown in this example, the change table 500 may include metadata 510 indicating the type of update (e.g. operation type) performed. As shown, the change table 500 may also include a primary key (e.g. combination of an identifier and a name). In some embodiments, the base table 100 and change table 500 may be maintained in a synchronous manner. Accordingly, the system may reference the change table 500 to ensure transactional consistency including referential integrity across various tables.

Figure 5B:
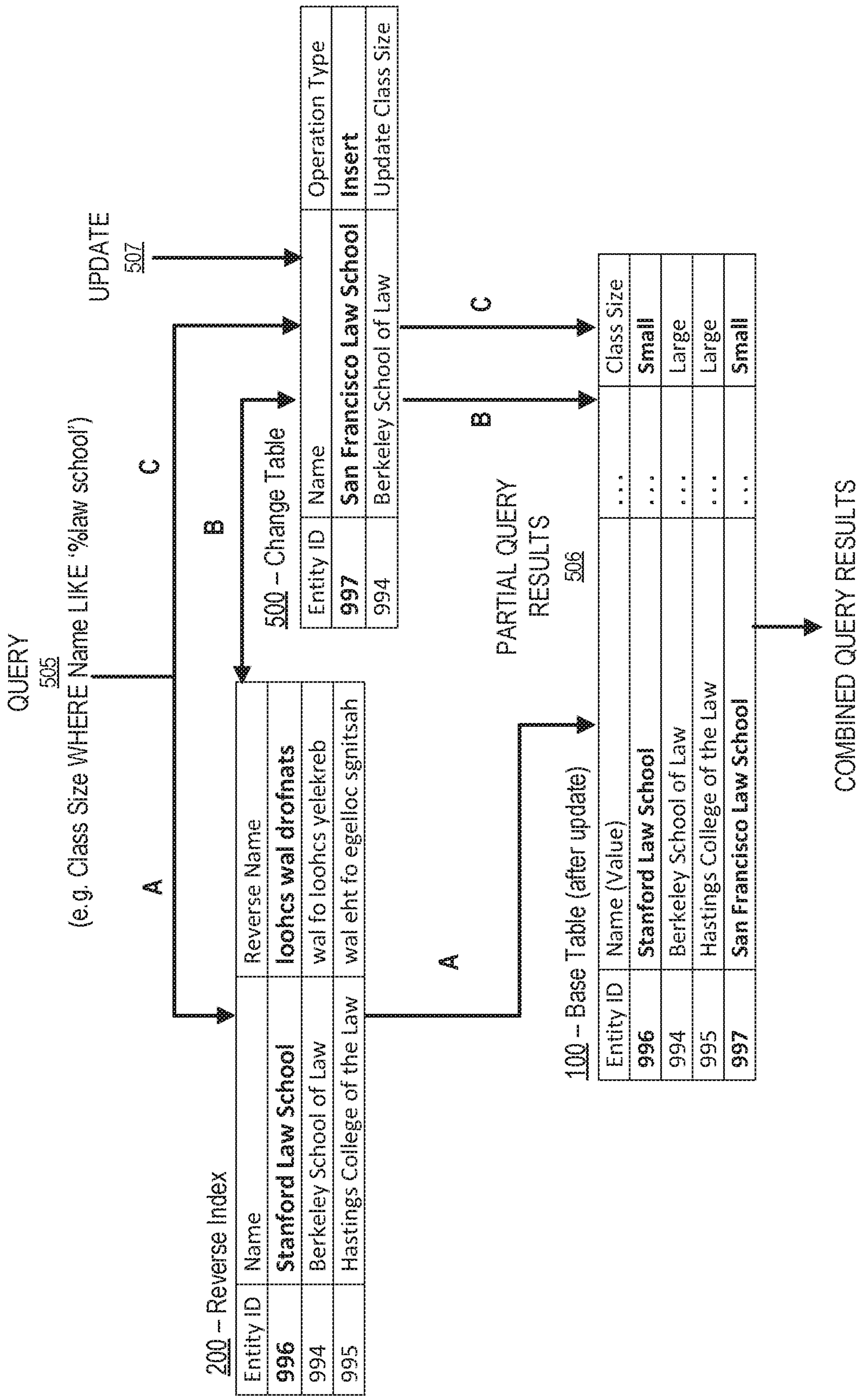
FIG. 5B shows an example of combining data from a specialized index and a change table in response to receiving a leading wildcard query according to one or more embodiments of the disclosure.

FIG. 5B shows an example of combining (or merging) data from a specialized index and a change table in response to receiving a leading wildcard query according to one or more embodiments of the disclosure. In this example, the system may maintain a specialized index, which in this example is a reverse index 200 (as shown in FIG. 2), and the change table 500 (as shown in FIG. 5A). In some embodiments, the system may combine (or merge) data from these two tables such that the most recent data is manipulated within the system. For example, when receiving a query, the system may perform a processing to obtain the most recent data by maintaining the transactional consistency of data, which may also include maintaining the referential integrity of data across a database. For instance, the system (e.g. database engine or query generator) may receive a query for data of a particular school before the particular school's data is inserted from the change table 500 (or change table objects) into a particular specialized index (e.g. the reverse index 200). Thus, to maintain transactional consistency and/or referential integrity of data, after receiving a query, the system may determine whether the query requests any data that is associated with a specialized index. As described, the database system maintains the transactional consistency of data and/or referential integrity of data across a database for queries that request data from a specialized index. In some embodiments, this may include the system referencing the metadata associated with a specialized index to determine whether the query for data includes any data that is in any specialized index. In some embodiments, when the system receives a query for data that is not associated with a specialized index, the most recent data that was manipulated only in the database table (e.g. database table's objects) would result in the query returning the most recent data. However, in some embodiments, when the system receives a query for data that is also associated with a specialized index, the most recent data may not have been manipulated yet from the change table into the specialized index. Queries received before data is manipulated from the change table to the specialized index would result in the query returning a query result based on data that differs between the change data table and the specialized index.

Accordingly, in some embodiments, if a query requests any data that is associated with a specialized index, a query result may be created by combining any data that is in a change table (or change table's object) with any requested data that is associated with or in the specialized index. For example, the system may combine law school data that is in the change table with any requested data that is in the specialized index to create a query result, for example, when the update reflecting in the change table includes an insert of law school data.

Now returning to the data merging example of FIG. 5B, a query 505 may include a request for the class size of schools with a name ending in "law school." As described above, such a request may include a leading wildcard query, for example, that includes a (WHERE Name LIKE '% law school') operation. As described, such a query includes a leading wildcard operator, and based on this example, the system may refer to a reverse index 200 for an efficient search. For example, a query optimizer of the system may determine (e.g. via metadata) whether the requested data is associated with a specialized index, which in this case is reverse index 200 based on the query including only a leading wildcard operator (e.g. no trailing or intermediate wildcard operators). Since the system determines the data requested by the query (or filter values) is associated with the reverse index 200, the system may refer to reverse index 200 to execute the query and identify entity 996 having a name of "Stanford Law School" as a partial query result 506 (e.g. sequence A). However, in this example, there was an update 507 to the base table and the query was received after the last asynchronous maintenance of the reverse index 200. For example, the query may have occurred during the window (e.g. 3 second window) after the update 507 in which entity ID 997 "San Francisco Law School" was inserted in the change table 500 but before data in the change table 500 is inserted into the reverse index 200. Accordingly, the system (e.g. query optimizer) may combine data in the change table 500 and the reverse index 200. By combining data in the change table 500 with the data in the reverse index 200 (e.g. specialized index), the system may identify entity ID 996 "Stanford Law School" and entity ID 997 "San Francisco Law School" as relevant partial query results 506 to the leading wildcard query. Accordingly, the system may then filter these results against the base table 100, which is maintained synchronously. As described, the system may filter the base table 100 using a combination of an entity ID and name of the partial query results 506. Accordingly, in this example, the system may filter the base table 100 to determine that Stanford Law School and San Francisco Law School have "small" class sizes. Having created a combined query result 508, the results may then be provided in response to the leading wildcard query. Accordingly, as shown, in one embodiment, the change table 500 may be combined twice with the base table 100 to result in the final combined query results 508. As shown, the change table 100 may be combined with the specialized index (e.g. reverse index 200) to rule out certain primary keys (e.g. sequence B), and then it may be combined again with the base table 100 (e.g. via a join on the primary key) to filter out values that match the original filter (e.g. sequence C). Accordingly, the system may output the query result created by combining data that is the change table 500 and with requested data that is associated with a specialized index (e.g. reverse index 200). Thus, transactional consistency including referential integrity of data may be maintained when providing such query results as shown in this example.

As described, according to a first aspect of the disclosure, the system may generate one or more specialized indexes.

Figure 6:
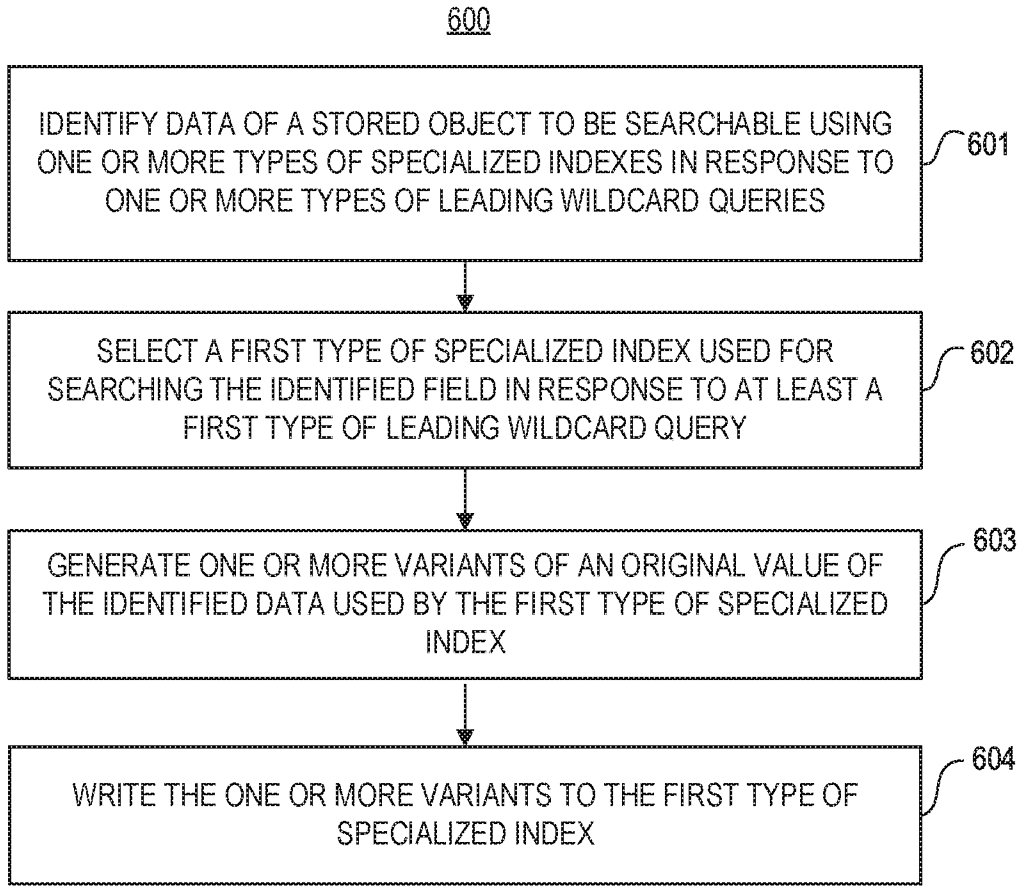
FIG. 6 shows an example flow diagram of a process for creating a specialized index to improve the efficiency of a leading wildcard search according to one or more embodiments of the disclosure.

FIG. 6 shows an example flow diagram of a process 600 for creating a specialized index to improve the efficiency of a leading wildcard search. Process 600 may use processing logic, which may include software, hardware, or a combination thereof. For example, process 600 may be performed using one or more components of system 10 (e.g. as further described in reference to FIG. 10).

In 601, the system may identify, within a database system, a field of a stored object to be searchable using one or more types of specialized indexes in response to one or more types of leading wildcard queries. For example, a developer may specify certain fields that are often searched with a leading wildcard query. Accordingly, such fields may be identified and values for those fields may be processed and included as part of the specialized index (or index) that may be referenced in response to executing a leading wildcard query. In one embodiment, the system may monitor or collect data regarding queries that are received by the system. Based on an analysis of this data, the system may determine certain fields, objects, terms, or other attributes are often associated with a leading wildcard query. Accordingly, based on this analysis, the system may identify certain fields, values, or objects that should be included as part of the specialized index.

As further described herein, the specialized index may include variants of an original value for a field to allow for an efficient data search.

In 602, the system may select a first type of specialized index for searching the identified field in response to at least a first type of leading wildcard query. In one embodiment, the first type of leading wildcard query may include at least a wildcard search identifier as a prefix for a search term. Accordingly, the system may determine what type of specialized index to create based on the anticipated types of queries. For example, based on the types of executed wildcard queries, the system may create a reverse index (e.g. index 200), a tri-gram (or n-gram) index (e.g. index 300), or may create a permutation index (e.g. index 400). Accordingly, the system may create a specific type of specialized index to handle various types of wildcard queries.

For example, the system may extract a value from one or more objects (or records) of the identified field. In addition, the system may identify a key (or primary key) for data associated with the identified field. This key may then be used to identify the correct data from which to extract a field value. For example, the primary key may include a combination of fields or a particular key value field.

In 603, the system may generate one or more variants of an original value of the identified field used by the first type of specialized index. For example, the type of variants that are required to be generated may depend on the type of the specialized index selected or created by the system in association with the identified field. For example, in the case of a reverse index (e.g. reverse index 200), a reverse of the original value may be generated. For example, the text string "university" may be reversed to create "ytisrevinu" as the reverse text string. In the case of a tri-gram index (e.g. tri-gram index 300), each variant may be a sequence of three (e.g. n) characters of the original value as shown in tri-gram index 300. In the case of a permutation index (e.g. permutation index 400), each variant may be a permutation of a portion or the entire original value. As described, in some embodiments, an application (e.g. application server) may perform some the processing to generate such variants. In one embodiment, resource intensive processing may be shared between various components to improve the overall efficiency of the database system. For example, some of the processing may at least be partially offloaded from a database system to an application (e.g. client or server application) as shown in FIG. 7.

Figure 7:
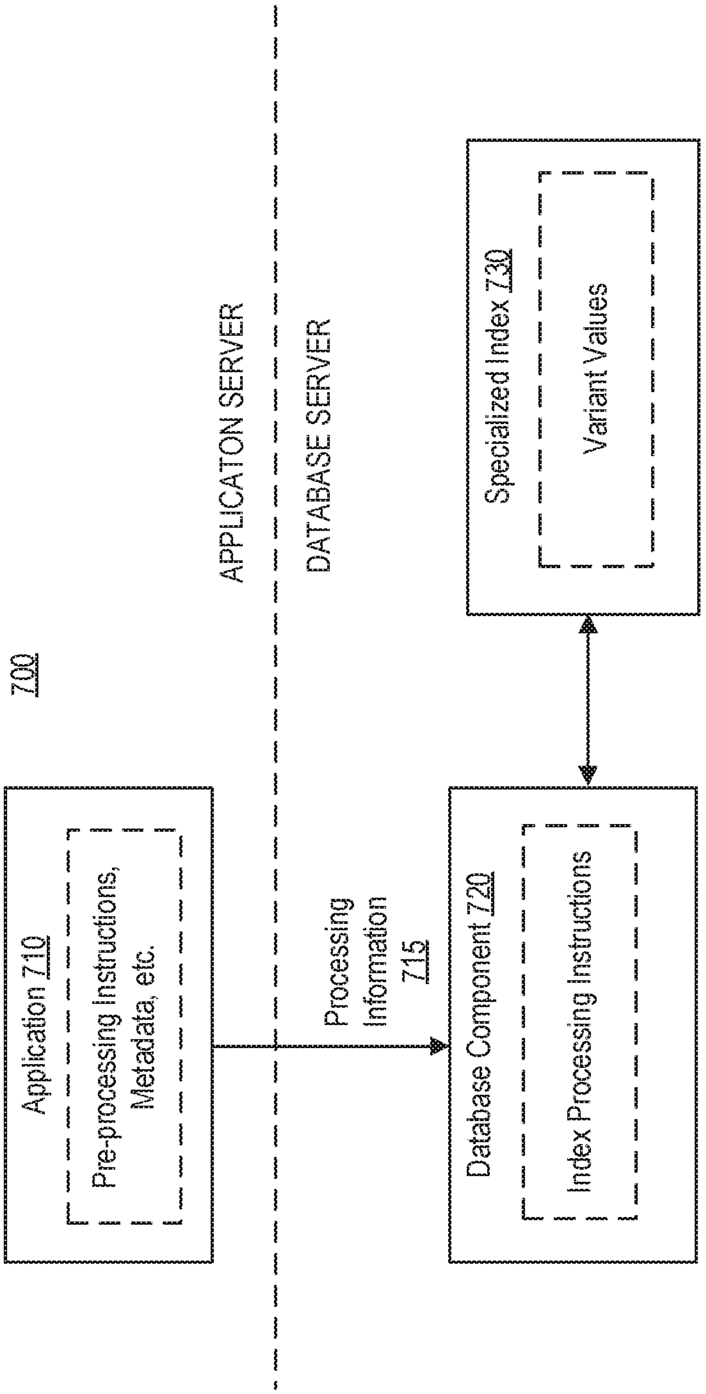
FIG. 7 shows an example of an interaction of components when processing information to create a specialized index according to one or more embodiments of the disclosure.

FIG. 7 shows a diagram 700 of an example interaction between components when processing information to create a specialized index according to one or more embodiments of the disclosure. As shown, the system may perform a processing between an application 710 (e.g. application server) and a database component 720 (e.g. database server). As shown in this example, the application 710 may reside on an application server and the database components may reside on a database server. In one embodiment, the database component 720 may receive processing information 715 in response to an application 710 performing at least a partial processing required to create a specialized index 730. In one embodiment, the application 710 may perform at least a partial pre-processing and provide information 715 (or information) for creating or updating a specialized index 730. This information may include instructions or metadata used by the database component 720. In one embodiment, the application 710 may provide information 715 in the form of instructions for parsing original value strings for dividing and/or permuting the original values to create variants to be stored in the specialized index 730. Accordingly, the database component 720 may leverage such information 715 instead of utilizing valuable processing resources to compute such values (or variant values). For example, the database component 720 may include index processing instructions (or code) for processing such information 715. In addition, or as an alternative, the application 710 may provide information in the form of the actual values of variants that the database component 720 may merely store in the specialized index 730. For example, the actual values of variants may include the reverse values, tri-gram values, permutation values, etc.

In some embodiments, the system may perform a normalization of the original value to create a normalized text string. For example, an original value of a particular field may include various characters (e.g. characters with accents), and thus, the system may perform a normalization process for the value. The normalization process may include performing certain transformations of the text of the value so variants may be generated. For example, the normalization may account for code points that should be represented. For example, if a name was, for instance, "Université de Montreal—Faculté de droit," which is a law school that includes characters in the French language including an accent character "(é)," the name may be modified using a normalization process in order for the name to be stored in a database table.

In one embodiment, the normalization may include performing a Unicode normalization (or a Unicode Normalization Algorithm) to create a normalized text string. For example, the normalized text string may include a normalized form as specified as part of a Unicode standard. For example, the Unicode Standard includes various normalizations forms including canonical decompositions and compatibility decompositions. For example, the normalization form may include Normalization Form D (NFD), which is a canonical decomposition; Normalization Form C (NFC), which is a canonical decomposition, followed by canonical composition; Normalization Form KD (NFKD), which is a compatibility decomposition; and Normalization Form KC (NFKC), which is a compatibility decomposition, followed by canonical composition. In one embodiment, the normalization process may include normalizing the value to a compatibility decomposition such as NFKC as described above.

Returning to FIG. 6, in 604, the system may write (e.g. after decomposition) the one or more variants to the selected specialized index (e.g. first type of specialized index). The specialized index may associate the one or more variants with the original value by including at least a first field for the original value and a second field for the one or more variants. For example, using the above example, the reverse value (e.g. "ytisrevinu") may be written to the specialized index. In one embodiment, the specialized index may include at least a first field (or column) for the original value (e.g. field 210) and a second field (or column) for a variant of the value (e.g. field 220, 320, or 420). As shown in FIGS. 2-4, the specialized indexes may associate the variants with the original value. For example, a table may include the original value in a first column (e.g. first field), and the variant of the value in a second column (e.g. second field). In addition, in some embodiments, the index table may include additional fields. By creating such specialized indexes, the system may perform an efficient leading wildcard query (e.g. as efficient as only a trailing wildcard query) by creating a structure that allows for efficient search data structures to be used such as a B-tree.

As described, the specialized index table may then be used for a subsequent leading wildcard query. In one or more embodiments of a second aspect of the disclosure, described is a mechanism to execute a query that utilizes the specialized index table. In some embodiments, the specialized indexes may be maintained in an asynchronous manner. For example, when a query is received, the system may perform various operations to ensure transactional consistency of data, which may include referential integrity across various tables. Accordingly, the system may allocate resources in an efficient manner while still providing synchronous functionality to the user.

In one embodiment, the system may work in conjunction with, or provide, various interfaces (or tools or components) to execute a query. For example, queries may be executed using tools such as a query builder (e.g. QueryBuilder). For instance, a query builder may be used to perform database searches by creating various types of data structures that may be parsed to create various queries (e.g. SQL, NoSQL, etc.). Accordingly, in some embodiments, the system (e.g. via a query builder) may perform various operations to execute and provide results for a query. For example, the system (e.g. via a query builder) may generate a new query, reference a specialized index (e.g. index 200, 300, or 400), and/or perform various operations (e.g. combine, join, merge, filter, etc.) to provide results for a query as described in FIG. 8.

Figure 8:
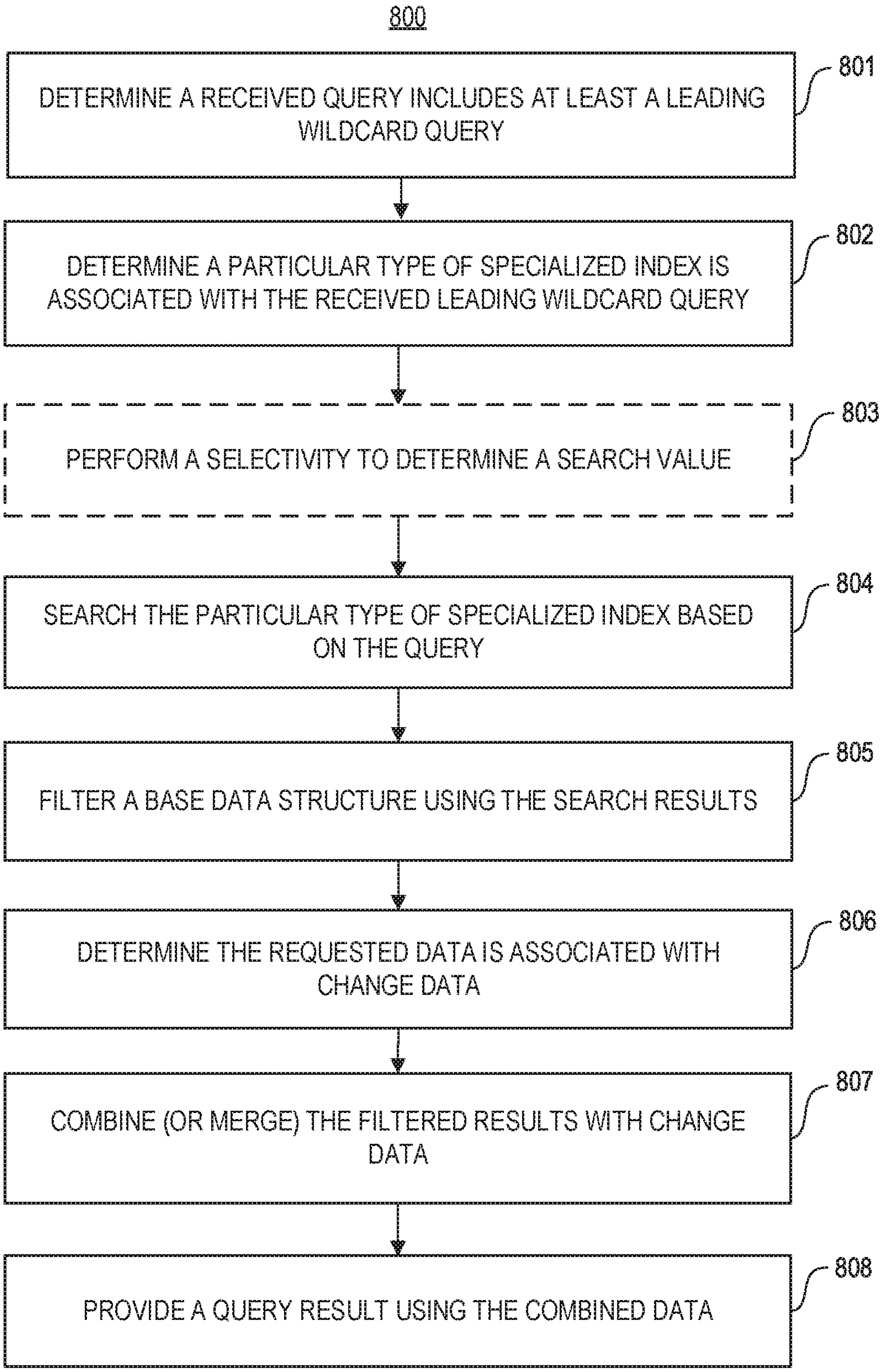
FIG. 8 shows an example flow diagram of a process for executing a leading wildcard query by utilizing the specialized index according to one or more embodiments of the disclosure.

FIG. 8 shows an example flow diagram of a process 800 for executing a leading wildcard query by utilizing the specialized index according to one or more embodiments of the disclosure. Process 800 may use processing logic, which may include software, hardware, or a combination thereof. For example, process 800 may be performed using one or more components of system 10 (e.g. as further described in reference to FIG. 10).

In 801, the system may determine whether a received query includes at least a leading wildcard query. For example, the system may process the query (e.g. via a query builder) and determine whether a leading, intermediate, and/or a trailing wildcard is provided. For example, the system may determine a received first query includes a first leading wildcard query that includes a first wildcard search identifier as a prefix for a first search term. As another example, the system may determine the received first query includes a leading and a trailing wildcard query that includes a first wildcard search identifier as the prefix for a search term and a second wildcard search identifier as a postfix for the search term. As yet another example, the system may determine the received first query includes a leading, trailing, and intermediate wildcard query that includes a first wildcard search identifier as the prefix for a first search term, a second wildcard search identifier as a postfix for a second search term, and third wildcard identifier between the first and second search terms.

In 802, the system may determine a particular type of specialized index (e.g. first type of specialized index) is associated with the received leading wildcard query. Accordingly, the system may determine whether the received query may be executed (e.g. improved or optimized) using a particular type of specialized index that the system may have created. For example, in response to determining the received query includes only a leading wildcard query, the system may determine the first search term is associated with a reverse index table of the database system (e.g. index 200). In response to determining the received query includes a leading wildcard operator as well as a trailing and/or intermediate wildcard operator, the system may determine the first search term is associated with a tri-gram index (e.g. index 300) or a permutation index (e.g. index 400). The system may determine a query or a search term included in the query is associated with the specialized index using various mechanisms. For example, the system may determine a search term corresponds to a field of an object that is stored in the specialized index. For example, if the query includes the search term associated with a school name, the system may determine whether a specialized index has been created for school names or associated objects.

In 803, the system may perform a selectivity to determine a search value. In some embodiments, in order to process a query that includes a leading, intermediate, and/or trailing wildcard, the system may perform additional steps (e.g. one or more heuristics) to improve the efficiency of such a search. In one embodiment, the system may perform one or more selectivity determinations. For example, when a query includes multiple search terms, the system may determine (or approximate) the prevalence of each search term within the database. In one embodiment, the system may perform a sampling (or one or more pre-queries) of data to determine the prevalence of a particular search term. For example, the system may sample X number of records from amongst the total of number of Y records of a data set. Based on the prevalence of a particular search term within the sample, the system may extrapolate the prevalence of a term amongst the entire data set. Based on such an extrapolation, the system may then search the term that is likely to be less prevalent to improve the efficiency of the search.

In some embodiments, the system may process a search term of the query in a similar manner as a value when updating (or creating) the specialized index. For example, the system may perform a normalization of the search term included in the query (e.g. first search term) to create a normalized text string (normalized first text string). For example, the search term may include various characters (e.g. characters with accents), and thus, the system may perform a normalization process for the term. In one embodiment, the normalization may include performing a Unicode normalization (or a Unicode Normalization Algorithm) to create a normalized text string. For example, the normalized text string may include a normalized form as specified as part of a Unicode standard as described above. In one embodiment, the normalization process may include normalizing the search term to a compatibility decomposition such as NFKC as described above. In addition, in some embodiments, the system may further process the query. For example, in one embodiment, the system may generate a variant of a search term. For example, the system may create a reverse text string of a normalized search term (e.g. text string). In addition, in some embodiments, the system may generate a new or modified query (e.g. a second query) from the original or initial query (e.g. first query). For example, in one embodiment, the modified query may include a reverse of a search term as a prefix to the first wildcard search identifier. For instance, if the original query includes (WHERE Name LIKE '%law school'), the modified query would include (WHERE Name LIKE 'loohcs wal%'). As shown in this example, the search term "law school" is reversed and is used as a prefix to the wildcard search identifier ("%").

In 804, the system may search the particular specialized index (e.g. first type of specialized index) based on the received query. For example, the system may search a specialized index using a filter value and/or a search term to identify a particular specialized index or relevant data (e.g. one or more records of table from which the specialized index is created). For example, the system may identify the original values associated with a variant that is identified based on a search term.

In 805, the system may filter a base data structure (e.g. base table 100) using the search results. For example, the system may filter an original value (or primary key) against a base table to identify relevant results for a query. Accordingly, the system may first search the specialized index that includes a primary key and/or original values, the results of which are used to identify relevant information from a base table to provide results in an efficient manner.

As described, the system may maintain certain database tables (e.g. the specialized indexes) in an asynchronous manner. Accordingly, in some embodiments, the system may determine if data within a change data table (e.g. data not yet included in the specialized index) should be included as part of the results to the query.

In 806, the system may determine the received query requests data associated with a change tracking data structure. Accordingly, the system may also search the change tracking data structure to identify a second set of data. In such instances, the system may combine the second set of data from the change tracking data structure with the first set of data obtained from filtering the base table using results from the specialized index.

In 807, the system may combine (e.g. merge or update) data from a change table (e.g. table 500) and data from filtering the base table with the search results from the specialized index. For example, the change table may store updated values and or metadata indicating various operations that have been performed (e.g. insert delete, etc.) since the last asynchronous maintenance of a specialized index. Accordingly, in order to provide the most recent and accurate results the system may include data that has yet to be committed to the specialized index by referencing a change data table (e.g. change table 500). In one embodiment, the system may maintain a change table that stores the changes to the primary keys that may be used by a specialized index. For example, the changes may be written to the change table in response to a trigger, or by an application in response to initiating an update to a value. In one embodiment, the system may periodically update the specialized indexes based on data from the change table. In one embodiment, the system may periodically flush (e.g. remove, delete, update, etc.) the data stored in the change table by merging the data from the change table with data of a corresponding specialized index.

In some embodiments, the operations performed to provide results to a query may depend on the attributes or the existence of particular data or data tables. For example, if the system determines a change set (or change table) is empty or not applicable, the system may forgo the combining step as described (e.g. step 802). In addition, if the system determines a combine operation would exceed a resource threshold (e.g. the data set for a merge operation is too large), the system may forgo the combine operation. As another example, if the specialized index is nonexistent (e.g. has not yet been created), the system may rely on performing a search limited to an underlying data structure (e.g. base table). In addition, as another example, if the system determines the change set exceeds a certain amount of entries (e.g. relative to the underlying base table), the system may forego searching the specialized index and perform a full search of the underlying data structure (e.g. a full search of a base table).

As described, the system may perform various operations to ensure transactional consistency including referential integrity across various tables. It should be noted that a further description of such operations are discussed in commonly assigned U.S. patent application Ser. No. 15/798,077, titled TRIGGER-FREE ASYNCHRONOUS MAINTENANCE OF CUSTOM INDEXES AND SKINNY PERFORMANCE META-STRUCTURES, filed on Oct. 30, 2017, and hereby incorporated by reference in its entirety and for all purposes.

In 808, the system may provide a query result for the received query using the combined data. For example, the system may provide as a result to the query the data obtained from filtering the base table using the specialized index along with any data obtained from a change tracking data structure (e.g. change table). Accordingly, the system may provide results to a query that are perceived by a user as being maintained synchronously despite certain data being maintained in an asynchronous manner.

Accordingly, in some embodiments, described is a mechanism for providing an efficient creation and processing of specialized indexes that may improve the performance of a database system when executing leading wildcard queries.

As described, embodiments of the disclosure may be performed within an operating environment.

Figure 9:
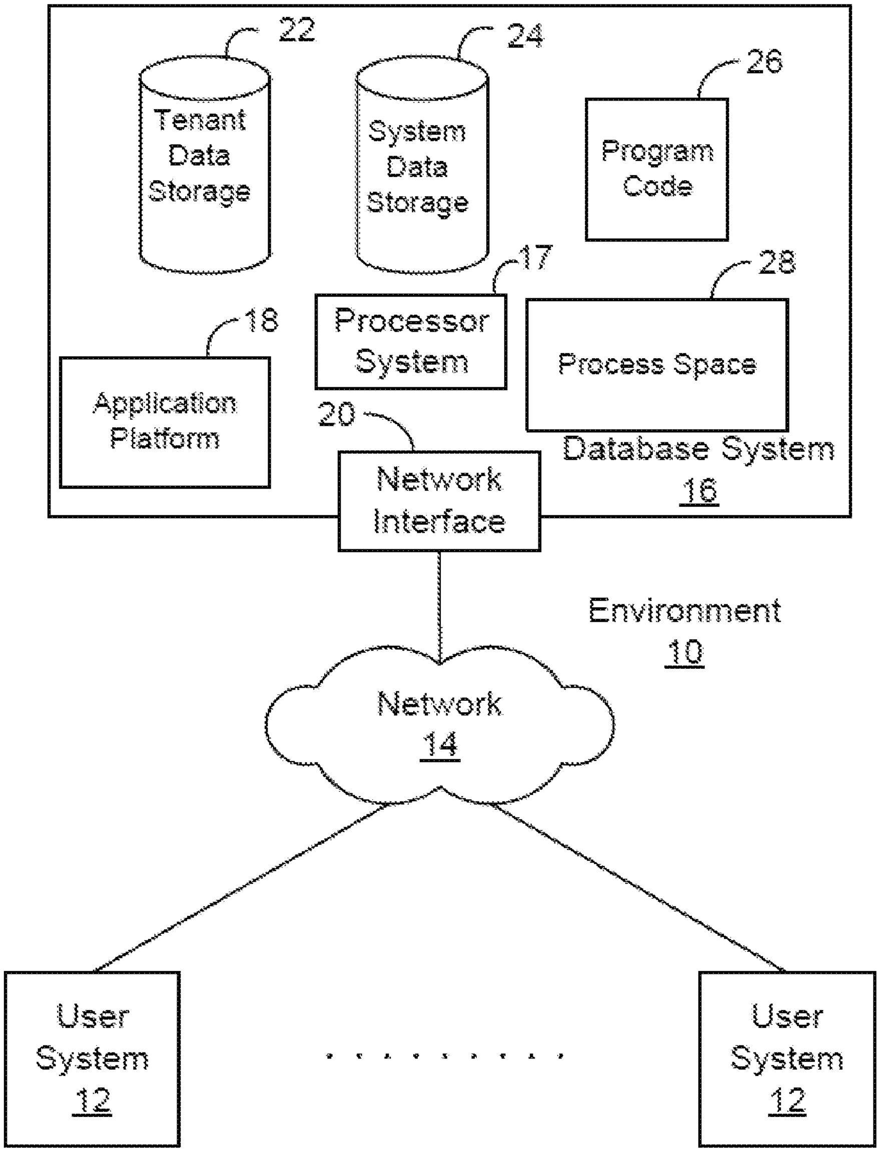
FIG. 9 shows a block diagram of an example environment in which on-demand database services may be provided according to one or more embodiments of the disclosure.

FIG. 9 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 10:
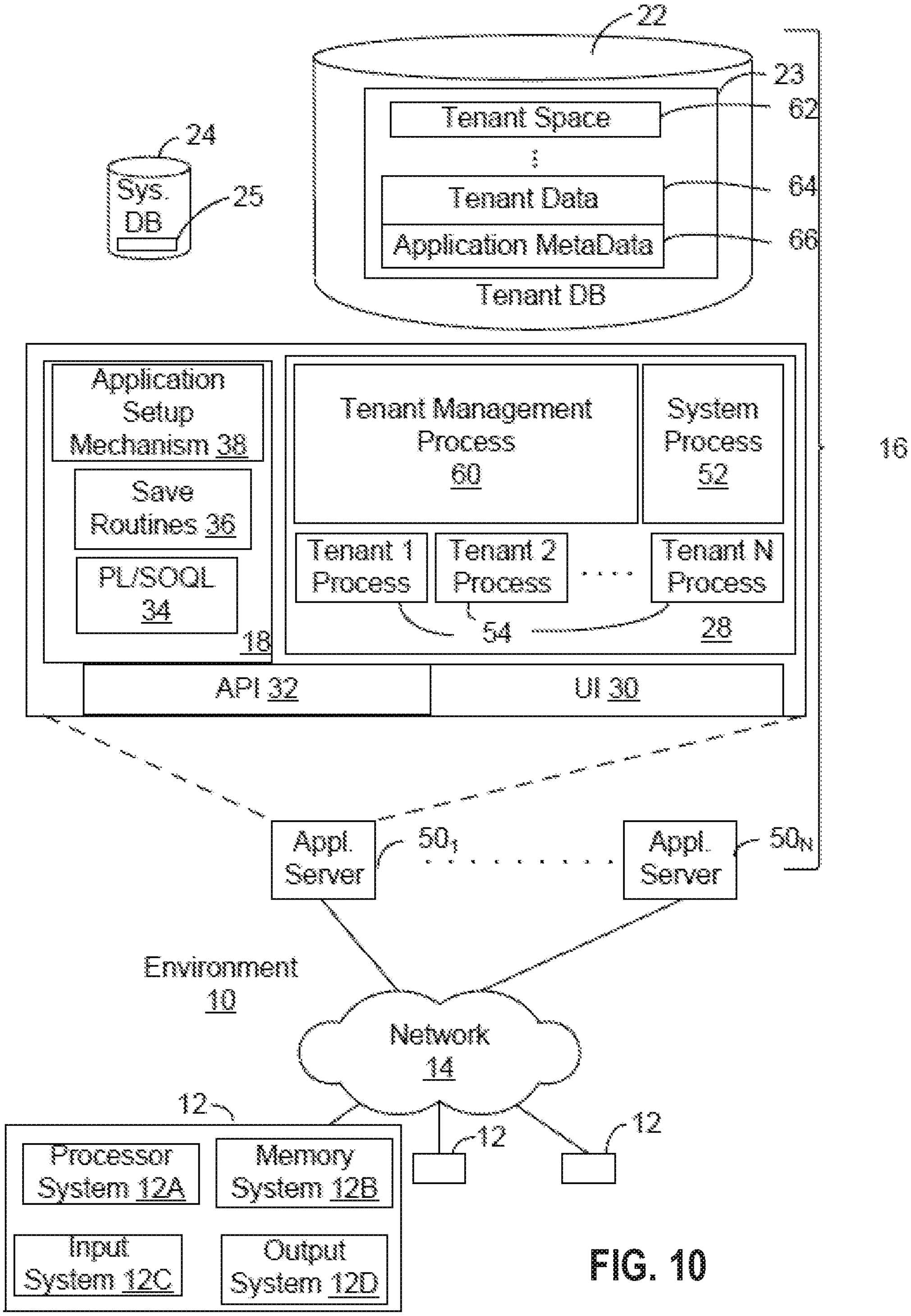
FIG. 10 shows a block diagram of example elements of FIG. 9 and various possible interconnections between these elements according to one or more embodiments of the disclosure.

FIG. 10 is a block diagram illustrating an example of elements of FIG. 9 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. FIG. 10 shows network 14 and system 16. FIG. 10 also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 11:
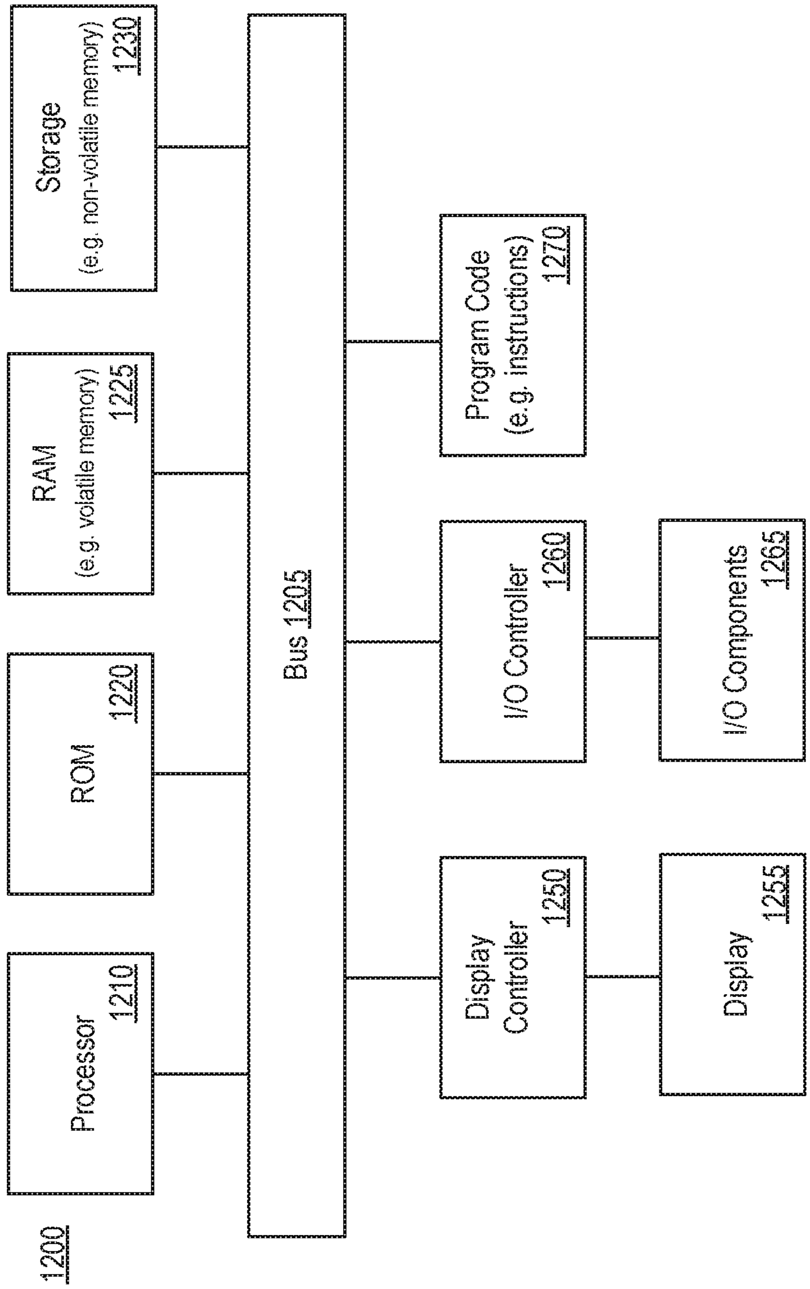
FIG. 11 shows a block diagram of an example computing system that may be used in conjunction with one or more embodiments of the disclosure.

FIG. 11 shows a block diagram of an example computing system that may be used in conjunction with one or more embodiments of the disclosure. For example, computing system 1200 (or system, or computing device, or device) may represent any of the devices or systems (e.g. database system 16) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory computer-readable medium (or machine-readable medium) or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 (or instructions, modules, components, units, functions, or logic) may represent any of the instructions, functions, or engines described above. Program code 1270 (e.g. program code 26) may reside, completely or at least partially, within the memories described above (e.g. non-transitory computer-readable media), or within a processor during execution thereof by the computing system. In addition, program code 1270 can be implemented as software, firmware, or functional circuitry within the computing system, or as combinations thereof.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level code that may be executed by a computing device such as a server or other data processing apparatus using an interpreter. Computer-readable media encoded with the program instructions may be packaged with a compatible device or provided separately from other devices (e.g., via Internet download). Any such computer-readable medium may reside on or within a single computing device or an entire computer system, and may be among other computer-readable media within a system or network.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system comprising:

one or more processors; and a non-transitory computer readable medium storing a plurality of instructions, which when executed, cause the one or more processors to perform operations comprising:

identifying, within a database system, a field of a stored object based on one or more types of leading wildcard queries and an analysis of data associated with queries previously received by the database system that indicates the identified field has a higher frequency of queries which include leading wildcard operators submitted by system users than other fields have, the identified field being searchable using one or more types of specialized indexes;

selecting a first type of specialized index used for searching the identified field based on a first type of leading wildcard query, the first type of leading wildcard query including at least a wildcard search identifier as a prefix for a search term;

generating one or more variants of an original value of the identified field used by the first type of specialized index; and writing the one or more variants to the first type of specialized index, the first type of specialized index associating the one or more variants with the original value.

2. The system of claim 1, wherein generating the one or more variants of the original value includes:

receiving information for generating the one or more variants of the original value in response to an application server performing at least a partial processing of the original value; and generating the one or more variants of the original value based on the received information.

3. The system of claim 1, wherein the information for generating the one or more variants of the original value includes instructions for parsing the original value.

4. The system of claim 1, wherein the information for generating the one or more variants of the original value includes values for the one or more variants.

5. The system of claim 1, wherein the first type of specialized index comprises a reverse index, and generating the one or more variants of an original value comprises generating a reverse of the original value.

6. The system of claim 1, wherein the first type of specialized index comprises an n-gram index or a permutation index, and the first type of leading wildcard query further includes a wildcard search identifier as a postfix for a search term.

7. The system of claim 1, the operations further comprising:

determining a received query includes a leading wildcard query;

determining the received leading wildcard query is associated with the first type of specialized index;

searching the first type of specialized index based on the query to identify data;

filtering a base data structure with the identified data to obtain a first set of data; and providing the first set of data as a query result for the received query.

8. The system of claim 7, the operations further comprising:

determining the received query requests data associated with a change tracking data structure;

searching the change tracking data structure to identify a second set of data;

combining the second set of data from the change tracking data structure with the first set of data; and providing the combined data as the query result for the received query.

9. The system of claim 8, the operations further comprising:

periodically flushing data from the change tracking data structure by merging the data from the change tracking data structure with data of the first type of specialized index.

10. The system of claim 7, the operations further comprising:

performing a selectivity between a plurality of search terms within the received query based on a prevalence of each search term with the database system.

11. The system of claim 1, the operations further comprising:

performing a normalization of the original value to create a normalized text string; and generating the one or more variants the original value from the normalized text string.

12. A method comprising:

identifying, within a database system, a field of a stored object based on one or more types of leading wildcard queries and an analysis of data associated with queries previously received by the database system that indicates the identified field has a higher frequency of queries which include leading wildcard operators submitted by system users than other fields have, the identified field being searchable using one or more types of specialized indexes;

selecting a first type of specialized index used for searching the identified field based on a first type of leading wildcard query, the first type of leading wildcard query including at least a wildcard search identifier as a prefix for a search term;

generating one or more variants of an original value of the identified field used by the first type of specialized index; and writing the one or more variants to the first type of specialized index, the first type of specialized index associating the one or more variants with the original value.

13. The method of claim 12, wherein generating the one or more variants of the original value includes:

receiving information for generating the one or more variants of the original value in response to an application server performing at least a partial processing of the original value; and generating the one or more variants of the original value based on the received information.

14. The method of claim 12, wherein the first type of specialized index comprises a reverse index, and generating the one or more variants of an original value comprises generating a reverse of the original value.

15. The method of claim 12, wherein the first type of specialized index comprises an n-gram index or a permutation index, and the first type of leading wildcard query further includes a wildcard search identifier as a postfix for a search term.

16. The method of claim 12, further comprising:

determining a received query includes a leading wildcard query;

determining the received leading wildcard query is associated with the first type of specialized index;

searching the first type of specialized index based on the query to identify data;

filtering a base data structure with the identified data to obtain a first set of data; and providing the first set of data as a query result for the received query.

17. The method of claim 16, the operations further comprising:

determining the received query requests data associated with a change tracking data structure;

searching the change tracking data structure to identify a second set of data;

combining the second set of data from the change tracking data structure with the first set of data; and providing the combined data as the query result for the received query.

18. A computer program product comprising computer-readable program code capable of being executed by one or more processors when retrieved from a non-transitory computer-readable medium, the program code including instructions to perform operations comprising:

identifying, within a database system, a field of a stored object based on one or more types of leading wildcard queries and an analysis of data associated with queries previously received by the database system that indicates the identified field has a higher frequency of queries which include leading wildcard operators submitted by system users than other fields have, the identified field being searchable using one or more types of specialized indexes;

selecting a first type of specialized index used for searching the identified field based on a first type of leading wildcard query, the first type of leading wildcard query including at least a wildcard search identifier as a prefix for a search term;

generating one or more variants of an original value of the identified field used by the first type of specialized index; and writing the one or more variants to the first type of specialized index, the first type of specialized index associating the one or more variants with the original value.

19. The computer program product of claim 18, wherein generating the one or more variants of the original value includes:

receiving information for generating the one or more variants of the original value in response to an application server performing at least a partial processing of the original value; and generating the one or more variants of the original value based on the received information.

20. The computer program product of claim 18, wherein the first type of specialized index comprises a reverse index, and generating the one or more variants of an original value comprises generating a reverse of the original value.

21. The computer program product of claim 18, wherein the first type of specialized index comprises an n-gram index or a permutation index, and the first type of leading wildcard query further includes a wildcard search identifier as a postfix for a search term.

22. The computer program product of claim 18, the operations further comprising:

determining a received query includes a leading wildcard query;

determining the received leading wildcard query is associated with the first type of specialized index;

searching the first type of specialized index based on the query to identify data;

filtering a base data structure with the identified data to obtain a first set of data; and providing the first set of data as a query result for the received query.

23. The computer program product of claim 22, the operations further comprising:

determining the received query requests data associated with a change tracking data structure;

searching the change tracking data structure to identify a second set of data;

combining the second set of data from the change tracking data structure with the first set of data; and providing the combined data as the query result for the received query.

* * * * *